United States Patent [19]

Shaklik et al.

[11] Patent Number: 5,542,692
[45] Date of Patent: Aug. 6, 1996

[54] INFLATABLE CUSHION ASSEMBLY AND SYSTEM

[75] Inventors: Brian Shaklik, Bountiful; Davin G. Saderholm, Salt Lake City, both of Utah

[73] Assignee: Morton International, Inc., Chicago, Ill.

[21] Appl. No.: 324,562

[22] Filed: Oct. 18, 1994

[51] Int. Cl.⁶ .......................... B60R 21/20; B60R 21/26
[52] U.S. Cl. ...................... 280/728.2; 280/740
[58] Field of Search ................. 280/728 A, 731, 280/743 R, 740, 736, 732, 728 R, 728.2, 743.1, 728.1

[56] References Cited

U.S. PATENT DOCUMENTS

| | | | |
|---|---|---|---|
| 3,674,284 | 7/1972 | Lohr | 280/731 |
| 4,101,146 | 7/1978 | Oehm | 280/731 |
| 4,167,276 | 9/1979 | Bell et al. | 280/731 |
| 4,183,550 | 1/1980 | Sudou | 280/728 A |
| 4,752,083 | 6/1988 | Honda | 280/731 |
| 4,810,005 | 3/1989 | Föhl | 280/732 |
| 4,828,286 | 5/1989 | Föhl | 280/731 |
| 4,830,401 | 5/1989 | Honda | 280/736 |
| 5,011,181 | 4/1991 | Laucht et al. | 280/731 |
| 5,022,675 | 6/1991 | Zelenak, Jr. et al. | 280/743.1 |
| 5,074,584 | 12/1991 | Jarboe | 280/731 |
| 5,141,247 | 8/1992 | Barth | 280/728 A |
| 5,209,511 | 5/1993 | Morita | 280/743.1 |
| 5,209,519 | 5/1993 | Shiga et al. | 280/728 A |
| 5,226,671 | 7/1993 | Hill | 280/743 R |
| 5,240,282 | 8/1993 | Wehner et al. | 280/728 R |
| 5,259,641 | 11/1993 | Schenk et al. | 280/728 A |
| 5,261,693 | 11/1993 | Krickl et al. | 280/732 |
| 5,290,060 | 3/1994 | Smith | 280/737 |
| 5,342,081 | 8/1994 | Rogerson | 280/728 A |
| 5,398,958 | 3/1995 | Taggart | 280/728 A |

FOREIGN PATENT DOCUMENTS

| | | | |
|---|---|---|---|
| 0469734 | 2/1992 | European Pat. Off. | |
| 63-184545 | 7/1988 | Japan. | |
| 3182855 | 8/1991 | Japan | 280/736 |
| 4208661 | 7/1992 | Japan | 280/728 A |
| 5294203 | 11/1993 | Japan | 280/728 A |

OTHER PUBLICATIONS

Patent Abstracts of Japan, vol. 18, No. 83 (M–1558), Feb. 1994, abstract of JP-A-05 294202.

Primary Examiner—Anne Marie Boehler
Assistant Examiner—Peter C. English
Attorney, Agent, or Firm—Taylor J. Ross; Gerald K. White

[57] ABSTRACT

An inflatable cushion assembly is provided in which the gas inlet opening of an inflatable cushion is provided with a plurality of retention flaps for insertion into corresponding openings circumferentially disposed about the inlet opening of a housing that stores the cushion. The free ends of the flaps are folded against the exterior of the housing. Some of the flaps may be held in this position by a tab extending from the housing exterior and passing through an aperture in the flap. Others may be held by bolts similarly passing through apertures, with the bolts then securing the housing to an inflator unit, with a diffuser of the inflator extending into the cushion. The system may include a partition disposed at the inlet opening of the cushion housing for receiving the diffuser therein to shield the gas inlet opening and retention flaps of the cushion from the heat and pressure of the inflator gas, and to provide an additional surface for the collection of solid residue.

38 Claims, 7 Drawing Sheets

INFLATABLE CUSHION ASSEMBLY AND SYSTEM

BACKGROUND OF THE INVENTION

1. Field Of The Invention.

The present invention relates to an inflatable cushion assembly for incorporation in an inflatable restraint system.

2. Related Art.

Inflatable restraint systems generally include an inflatable cushion, commonly referred to as an air bag and hereinafter referred to as a cushion, disposed within a housing, and an inflator for generating a fluid, usually in the form of a gas, for inflating the cushion. The cushion is typically formed of a flexible material such as nylon, and stored within the housing in a folded or collapsed condition. The cushion has a gas inlet opening which is attached to the housing and/or inflator to permit entry of the gas into the cushion after being activated by the inflator. The gas is directed from the inflator into the cushion by means of a diffuser containing a plurality of orifices for distributing the gas into the cushion in a substantially uniform manner. The diffuser therefore serves the function of throttling the flow of gas and provides for the proper fill rate to the cushion. The presence of a diffuser somewhat reduces the possibility of rupture of the cushion, or separation from its attachment within the system, owing to the effects of heat and pressure from the inflator gas during the cushion's deployment.

Attachment of the cushion to its associated counterpart within an inflatable restraint system is therefore important for the successful deployment of the cushion and safe operation of the system. Various types of designs have been used in the past. One such design is disclosed in U.S. Pat. No. 5,141,247 issued to Barth, wherein an air bag, inflator and support plate are clamped together using a series of tabs extending from a circular retainer member. One set of tabs extend radially outward from the retainer member to clamp the air bag between the support plate and the retainer flange, while another series of tabs are used to clamp the inflator flange and support plate together. The retainer member therefore secures the air bag, inflator and support plate together. Unfortunately, the addition of another part to the module adds to the complexity of the system thereby adding weight and cost of materials for the assembly and production of the air bag module.

U.S. Pat. No. 5,226,671 issued to Hill discloses deflectable flaps formed at the fluid inlet opening of an air bag by providing a series of slits at the inlet opening. However, the flaps overlie the fluid inlet opening of the air bag and are not used to secure the air bag to the housing. Securement is accomplished by a series of mounting holes in the cushion located radially outward of the deflectable flaps.

Another system for incorporating an air bag into an inflatable restraint system is described in U.S. Pat. No. 5,240,282 issued to Wehner et al. which shows a pair of end flaps 40a and 40b fastened to a housing by a series of studs inserted into openings provided in the flaps. The system, however, utilizes a retainer member for the combined attachment of the inflator and air bag within the housing.

And in U.S. Pat. No. 5,261,963 issued to Krickl et al., the border of the inlet opening of the air bag is connected to a housing by the use of rods inserted into tubular portions formed at the inlet opening which in turn are inserted into corresponding grooves of a quadrangular base plate for securing the bag to the housing.

In each of the foregoing patents, the attachment of the cushion is complicated in that extra materials are needed in the form of retention plates, frames or rods. The mounting structures are such that the gas inlet opening of the cushion is susceptible to rupture or tearing from its associated housing during the deployment process. Moreover, as inflatable restraint systems become more compact, less room is available for the individual components that make up the air bag module which requires that the attachment assembly for the cushion be efficient in overall design. The design of the cushion assembly must also be such that the cushion, especially at its gas inlet opening, is protected from the heat and fragments of the inflator gas when the inflator is activated.

SUMMARY OF THE INVENTION

In accordance with the present invention, an improved inflatable cushion assembly is provided for use in an inflatable restraint system. The cushion assembly comprises an inflatable cushion which includes a gas inlet opening for receiving a fluid, typically a gas, from an inflator to inflate the cushion, and a plurality of retention flaps which extend from the periphery of the gas inlet opening of the cushion. The assembly also comprises a housing for containing the cushion interiorly thereof. The housing includes an inlet opening that communicates with the gas inlet opening of the cushion to permit passage of the gas from the inflator therethrough.

Means for attaching the cushion to the housing is also included in the assembly which comprises a plurality of cushion retention openings, circumferentially disposed in the housing about its inlet opening, for receiving a corresponding number of retention flaps therethrough. The cushion retention openings are preferably in the form of arcuate slots that are substantially concentric with the inlet opening of the housing. Once the retention flaps are inserted through the cushion retention openings, means are provided for securing the flaps to the housing. In one aspect of the invention, securement of the cushion retention flaps to the housing may be obtained by providing the housing with a plurality of protrusions extending exteriorly thereof and proximate to the respective cushion retention openings. The protrusions are configured for engagement with the corresponding retention flaps, preferably with at least one opening provided in the flap corresponding to the size and configuration of the protrusion to provide a "buttoning" effect. This arrangement of securing the cushion flaps to the housing has the advantage of eliminating the need for a retainer ring or plate for attaching the cushion to the housing as discussed above under the Related Art heading, thereby rendering the assembly lighter in weight, less complex, and efficient to manufacture.

The protrusions may take any form for engaging the flaps to secure them to the housing exterior, and include fasteners in the form of studs inserted through the housing, a nut and bolt arrangement with the bolt being inserted through the housing into the corresponding opening in the retention flap, or tabs projecting exteriorly from the housing for incorporation into a correspondingly configured opening provided in the flap. In the circumstance when tabs are used for engaging the retention flaps, the tabs and housing are preferably of monolithic construction.

In another aspect of the invention, an inflatable restraint system is provided wherein in addition to the cushion assembly described above, the system includes an inflator for emitting a fluid, typically a gas, to inflate the cushion. The inflator comprises a flange for securing the inflator to the cushion housing to permit passage of the gas emitted from the inflator through the housing inlet opening into the cushion. The inflator also includes a diffuser which comprises a plurality of apertures for uniformly directing the inflator gas into the cushion.

As an alternative embodiment for attaching the cushion to the housing, the protrusions for engaging and securing the retention flaps within the restraint system may take the form of studs and/or a nut and bolt arrangement inserted through the housing, retention flaps and inflator flange for their respective securement to each other. Securement of the cushion to the housing is enhanced by retaining the retention flaps between the housing and inflator flange. Another embodiment includes securement of the retention flaps exteriorly of the housing by using a combination of studs and tabs. The studs are inserted through respective openings provided in the housing, a first series of retention flaps, and the inflator flange. A second series of retention flaps with appropriate openings are engaged with the retention tabs projecting exteriorly from the housing. As already noted above, attachment of the cushion retention flaps is made more secure by retaining the flaps between the housing and inflator flange.

In yet another aspect of the inflatable restraint system according to the invention, the inflator is provided with a partition formed about the housing inlet opening for receiving the diffuser therein to separate the diffuser from the interior of the cushion. The partition, like the diffuser, includes a plurality of apertures to allow passage therethrough of the inflator gas from the inflator and diffuser into the cushion upon activation of the inflator. In accordance with a preferred embodiment of the invention, the diffuser and partition are configured in such a way that a continuous space, typically an annular space, is created between them. The space between the partition and diffuser is optionally provided with a closure means below the diffuser and partition apertures relative to the housing inlet opening, for the collection of solid inflator gas residue thereon. The closure means preferably takes the form of a plate positioned between the diffuser and partition and secured to the partition, or alternatively may take the form of a plate secured to the bottom of the partition to house the diffuser therein.

The apertures of the partition may optionally be provided with a covering means, such as a coarse screen or an assembly of wraps of metal and/or ceramic fiber materials for filtering solid inflator gas residue. The covering means is preferably positioned in the space between the partition and diffuser.

The diffuser serves the function of throttling the gas flow as well as cooling the inflator gas due to the thermal mass of the diffuser and the change in direction of the gas when entering the cushion. In addition, by varying the size and alignment of the respective diffuser and partition apertures, the proper fill rate of the gas to the cushion assembly can be further regulated. Thus, the partition provides a secondary means for regulating the fill rate of the inflator gas entering the cushion. The partition also offers a shield in the area of the cushion that is exposed to the heat and pressure of the inflator gas. This minimizes the possibility of any rupture or separation of the cushion from its attachment to the housing. The partition also provides another surface, in addition to the diffuser surface, for the particles and solid residue contained in the gas to adhere to.

BRIEF DESCRIPTION OF THE DRAWINGS

A better understanding of the invention and its operating advantages may be obtained by reference to the following detailed description when taken in conjunction with the accompanying drawings wherein certain preferred embodiments are illustrated and wherein like numerals refer to like parts throughout. Thus.

DETAILED DESCRIPTION OF THE INVENTION AND PREFERRED EMBODIMENTS THEREOF

Figure 1:
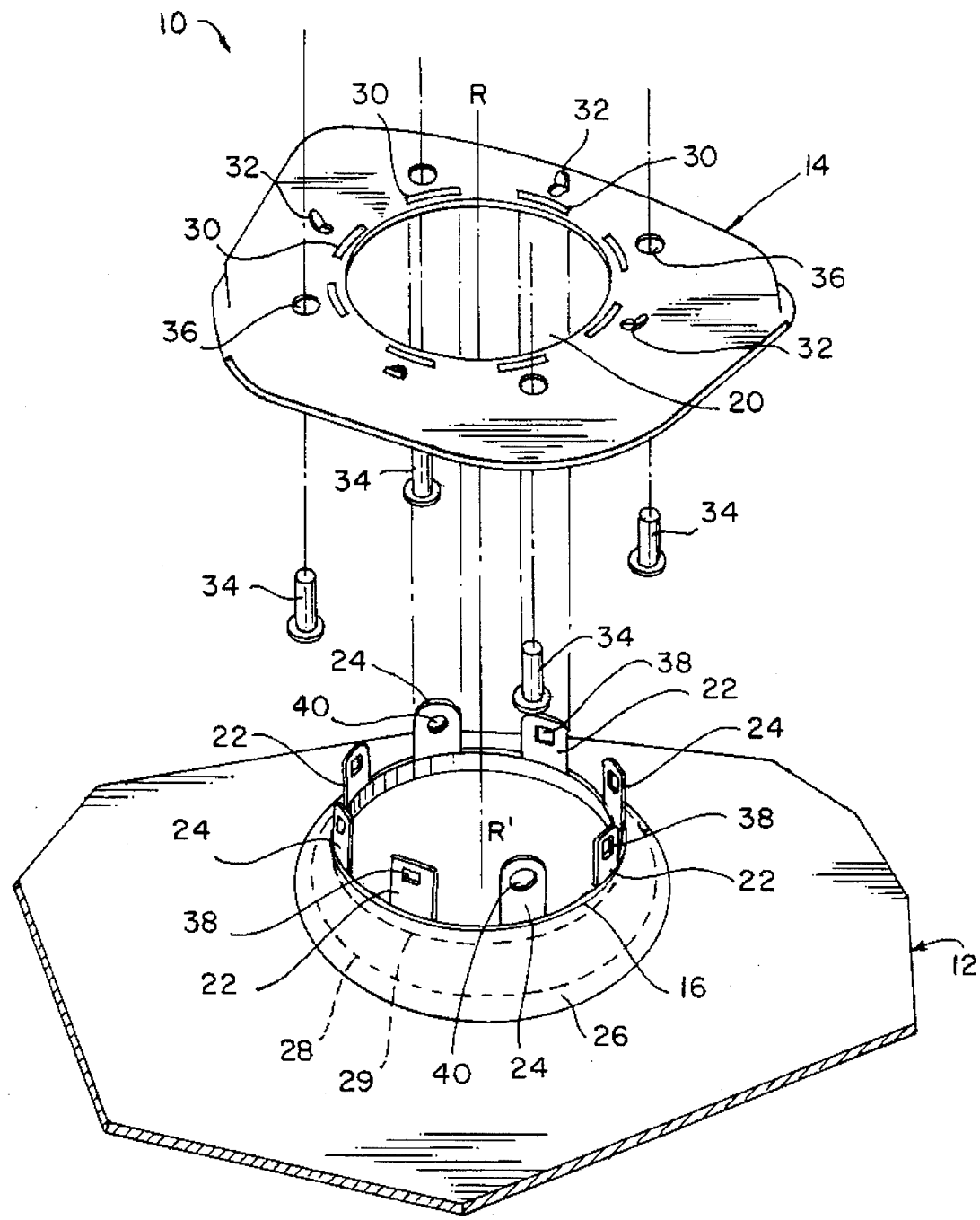
FIG. 1 is an exploded perspective view of an inflatable cushion assembly showing a fragmented section of the cushion and the manner of attachment within its housing according to one aspect of the invention.
Figure 5:
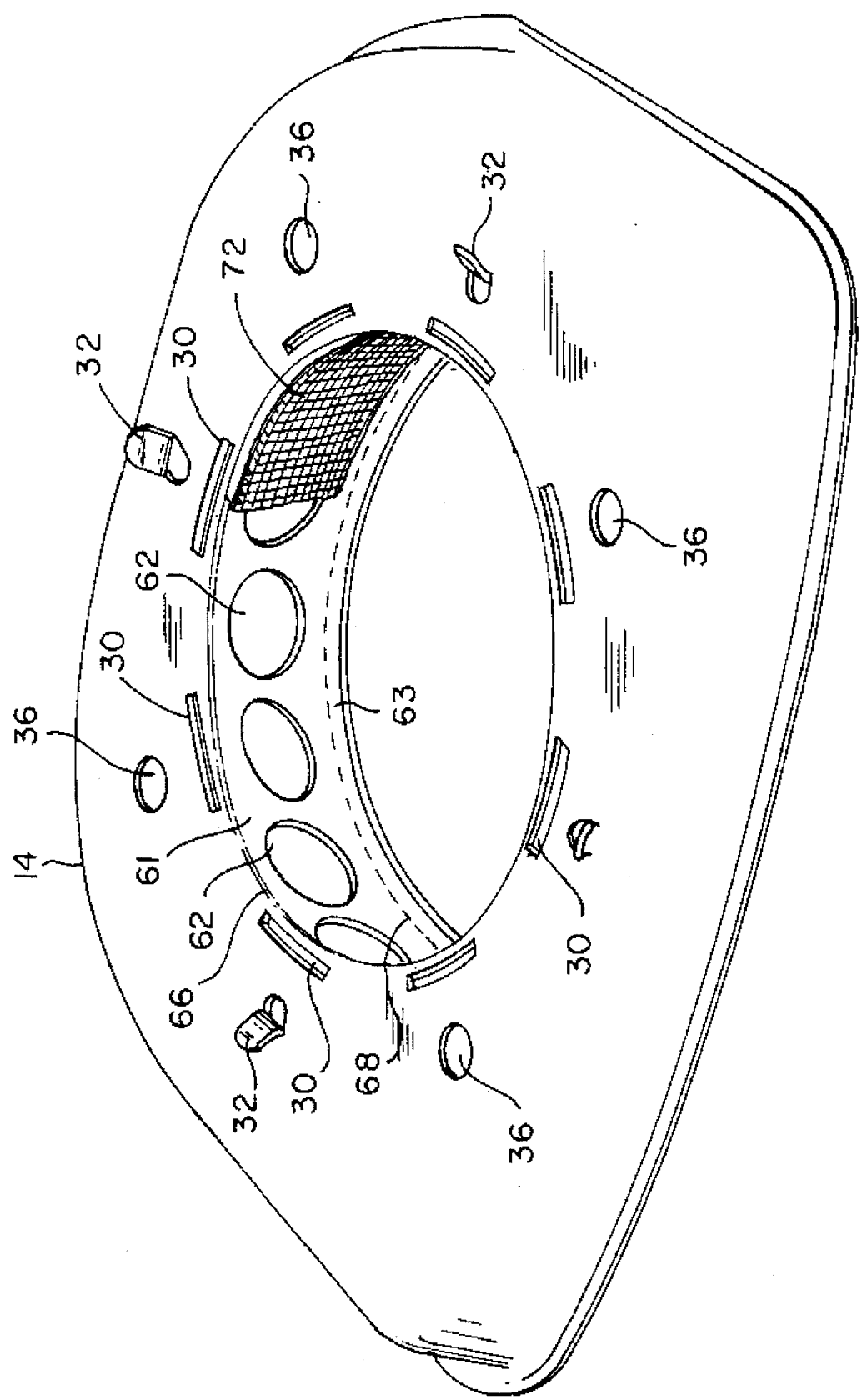
FIG. 5 is an enlarged isolated perspective view of the housing shown in FIG. 4A.

The present invention provides an inflatable cushion assembly for incorporating an inflatable cushion into an inflatable restraint system. The invention allows the cushion to be attached and secured to its housing counterpart without the need of a retainer ring or similar device. Referring to FIG. 1, an exploded perspective view of an inflatable cushion assembly 10 comprises a cushion 12 (a portion of which is shown in a deployed state) for containment within a housing 14. Housing 14 comprises a recess, which is best illustrated in FIG. 5, for the storage of cushion 12 in a collapsed, folded condition.

Cushion 12 includes a gas inlet opening 16 which defines that area of the cushion, as the name implies, for admitting a gas from an inflator 42 (FIG. 4) through an opening 20 provided in housing 14 to inflate the cushion for protecting a person from serious injury during sudden deceleration of a vehicle employing the restraint system, for example, if the vehicle were involved in a collision.

Figure 2:
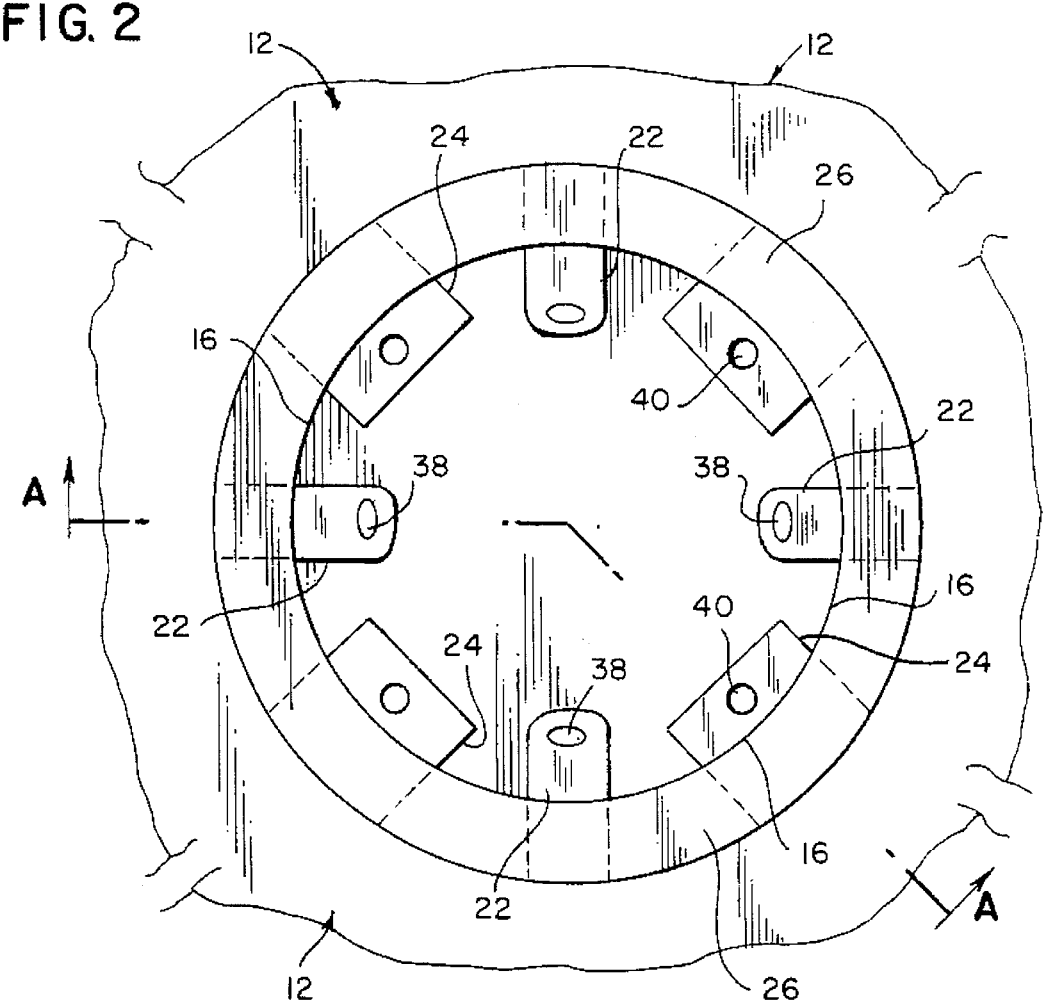
FIG. 2 is a top plan view on an enlarged scale of the inlet opening of the cushion illustrated in FIG. 1.
Figure 3:
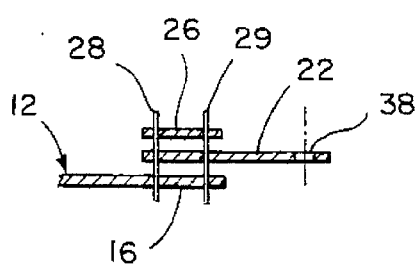
FIG. 3 is a cross-sectional view of a portion of the inflatable cushion illustrated in FIG. 2 taken along the lines A—A.
Figure 3:
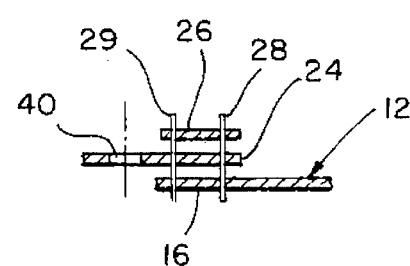
Figure 3:

As will be seen from FIGS. 1, 2 and 3, the gas inlet opening 16 of cushion 12 has a plurality of tab retention flaps 22 and stud retention flaps 24 attached about its periphery in an alternating arrangement, each of which is overlaid by a reinforcement patch 26. Attachment of tab retention flaps 22, stud retention flaps 24 and reinforcement patch to gas inlet opening 16 may be accomplished by any means known in the art, such as by sewing stitches or seams represented by stitch lines 28 and 29 in FIGS. 1 and 3. The arrangement of flaps 22 and 24 relative to gas inlet opening 16 and reinforcement patch 26 may take any form to ensure securement to each other, for example, by securing the flaps between reinforcement patch 26 and gas inlet opening 16 in the manner shown in FIG. 3; by securing gas inlet opening 16 between the flaps and reinforcement patch 26; or by fastening reinforcement patch 26 consecutively to flaps 22 and/or 24 and gas inlet opening 16 such that patch 26 is exposed to the interior of cushion 12. The latter example of the arrangement of these members is the reverse order from that shown in FIG. 3 which provides added protection to the flaps and gas inlet opening 16 from the heat and pressure of inflator gas exiting diffuser 48 (see FIGS. 6–8).

The number of tab retention flaps versus the number of stud retention flaps employed at the gas inlet opening of cushion 12 may vary depending on the embodiment used for securing inflator 42 to cushion housing 14 which is explained in greater detail below. In any event, the total number of flaps employed will be sufficient to insure an adequate and secure attachment of cushion 12 to its housing counterpart without compromising the integrity of the housing through the use of cushion retention openings 30.

The material used for cushion 12 is usually a light-weight, woven, nylon material. However, depending on the amount of gas that the inflator 42 is designed to generate for entry into cushion 12, the performance of the cushion can be tailored by using different materials for its fabrication. For example, using a coated non-porous cushion material, such as a tightly woven nylon coated with a synthetic rubber material, e.g., neoprene, will provide a harder surface for coming into contact with the vehicle occupant as compared with an uncoated porous cushion (e.g., one that is manufactured with a 420 Denier nylon) using the same inflator and pyrotechnic charge. Vents may also be used at strategic portions of the cushion for limiting the pressure that the cushion is exposed to during its deployment.

The material used for tab retention flaps 22, stud retention flaps 24 and reinforcement patch 26 may be the same as that making up cushion 12, which, as indicated above, is a woven nylon material. Alternatively, and depending on their arrangement with respect to each other and gas inlet opening 16, flaps 22 and 24 and reinforcement patch 26 may be formed from a heavier woven material or tear resistant and/or flame retardant material available under the trademarked names of Nomex® and Kevlar® aramid fabrics. These fabrics are available from the E.I DuPont de Nemours & Company. Varying combinations of materials may also be used for each of the foregoing members, thereby taking into account economical, strength, and/or heat resistance considerations.

Referring once again to FIG. 1, housing 14 is provided with a plurality of cushion retention openings 30 about the perimeter of opening 20 for receiving the corresponding cushion retention flaps 22 and 24 therethrough. A plurality of protrusions in the form of tabs 32 are positioned on the exterior surface of housing 14 radially outward from control axis R-R' of openings 30. The protrusions may also take the form of fasteners such as studs 34 inserted through respective stud openings 36 in housing 14 also positioned radially outward of openings 30. Once inserted through cushion retention openings 30, tab retention flaps 22 are engaged with tabs 32 by means of a corresponding opening 38 provided in each flap. The tab retention flap openings 38 are hooked over the respective tabs which may then be flattened against housing 14 to secure the flaps to the housing exterior. In like fashion, stud retention flaps 24 are secured to their corresponding studs 34 by inserting the stud into a corresponding opening 40 provided in flaps 24. In order to enhance the securement of both types of flaps to their respective fastening devices, flap openings 38 and 40 are configured in shape and size to be slidably engaged with the respective tabs and studs. Any significant play in the flap openings is thereby avoided. With the foregoing arrangement, attachment of the cushion to its corresponding housing is accomplished without the necessity of including a separate part, such as a retaining ring, to clamp or secure the cushion in place.

Figure 4:
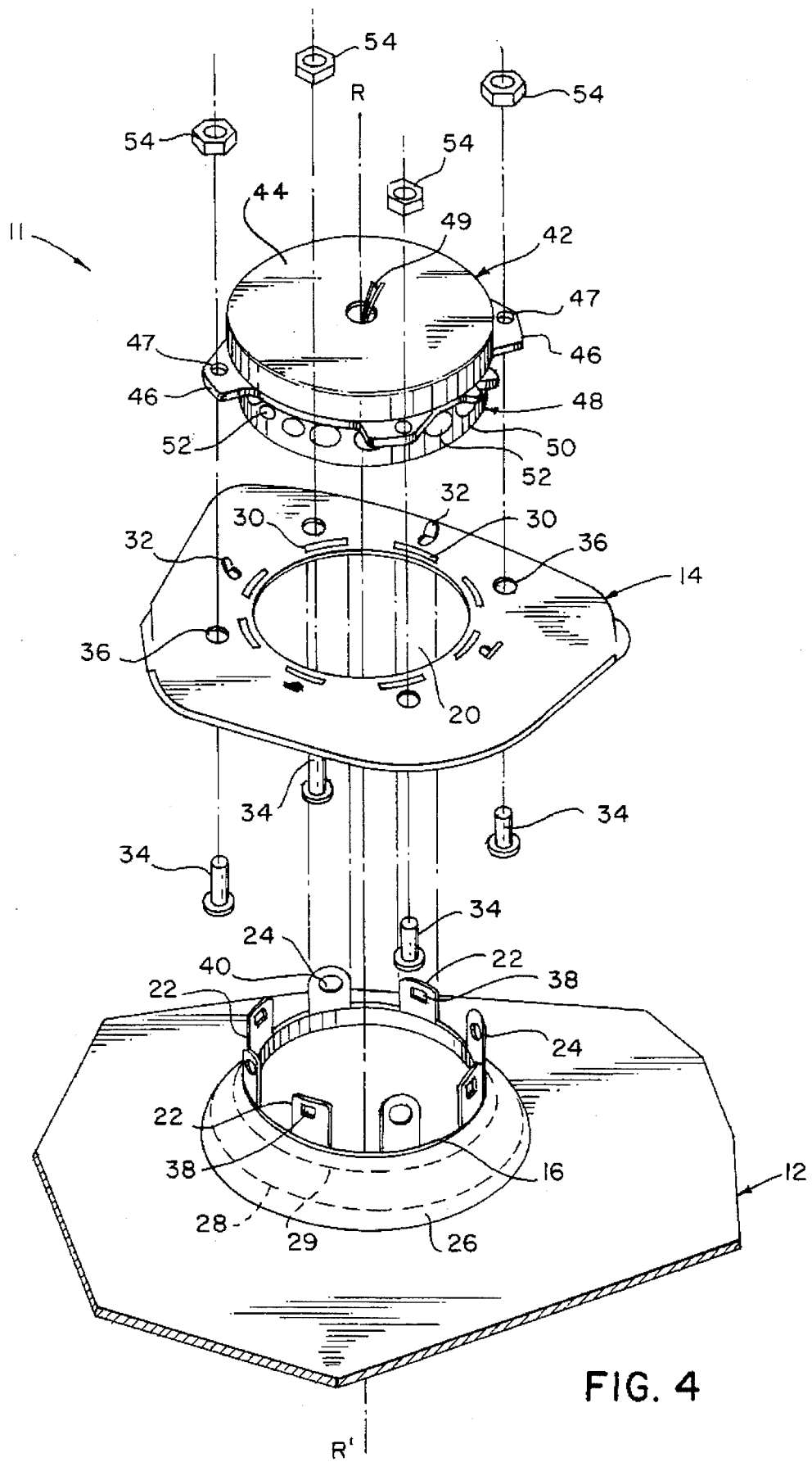
FIG. 4 is an exploded perspective view of an inflatable restraint system incorporating the cushion assembly shown in FIG. 1.

In accordance with another aspect of the invention, an inflatable restraint system 11 is illustrated in FIG. 4 and comprises the cushion assembly 10 described above and an inflator 42. Inflator 42 comprises a cylindrical housing 44 for encasing a pyrotechnic charge (not shown) which generates or releases a gas to inflate cushion 12 upon activation by an igniter (also not shown), in a known manner, from a signal conveyed by lead wires 49. The inflator further includes a flange 46, extending radially outward from central axis R-R' and disposed between the housing 44 and a diffuser 48. Diffuser 48 comprises a cylindrical sleeve 50 that is joined at one end to flange 46 by conventional means, for example by welding. The other end of sleeve 50 is joined to and sealed by a closure plate 51 (FIGS. 6 and 7) which is impervious to the inflator gas. A plurality of orifices 52 are provided in sleeve 50 for uniformly dispensing the inflator gas into the cushion assembly 10 when inflator 42 is energized.

Figure 4A:
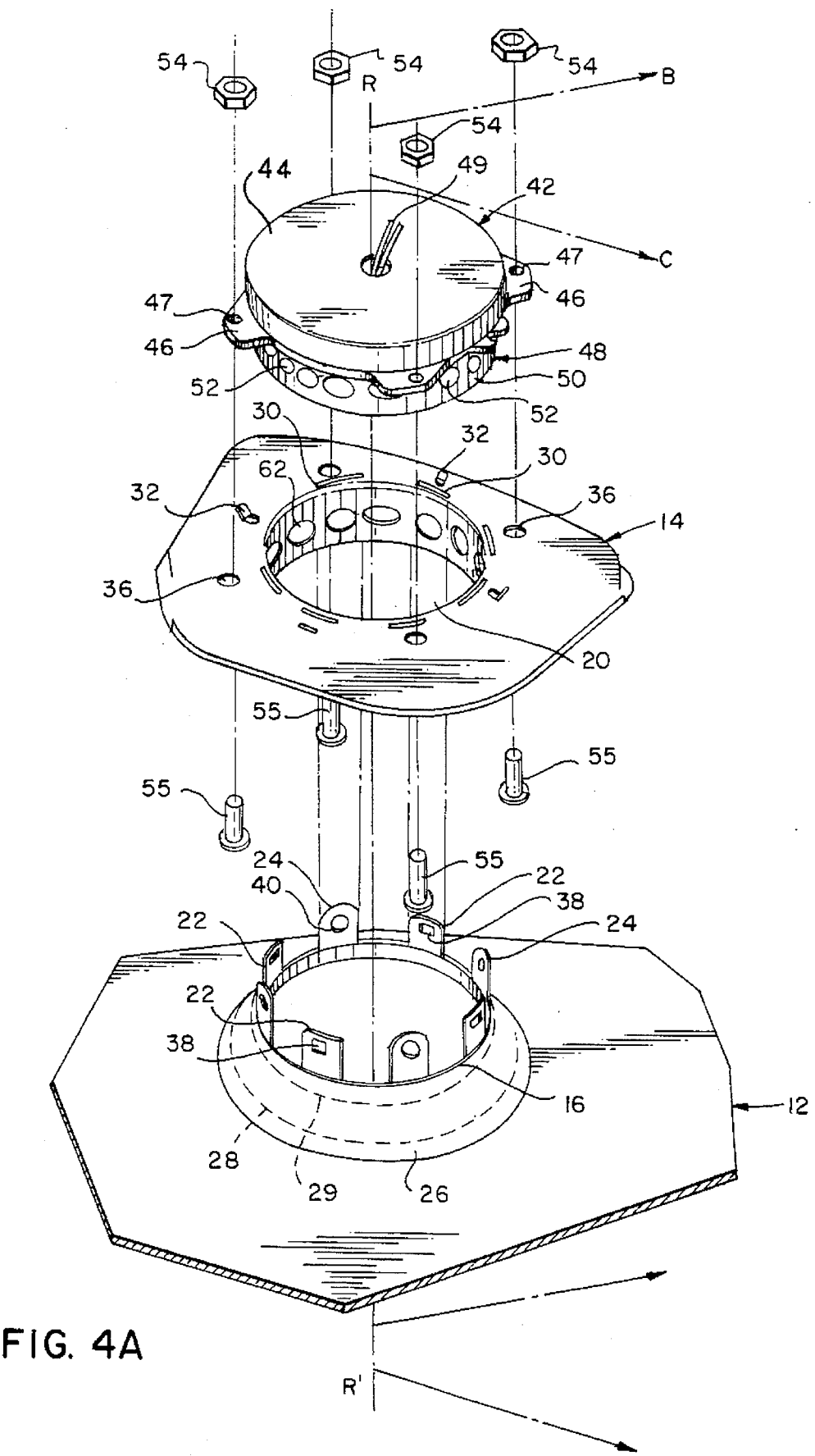
FIG. 4A is an exploded perspective view of the inflatable restraint system shown in FIG. 4 with the addition of a partition to the cushion housing in accordance with another embodiment of the invention.
Figure 6:
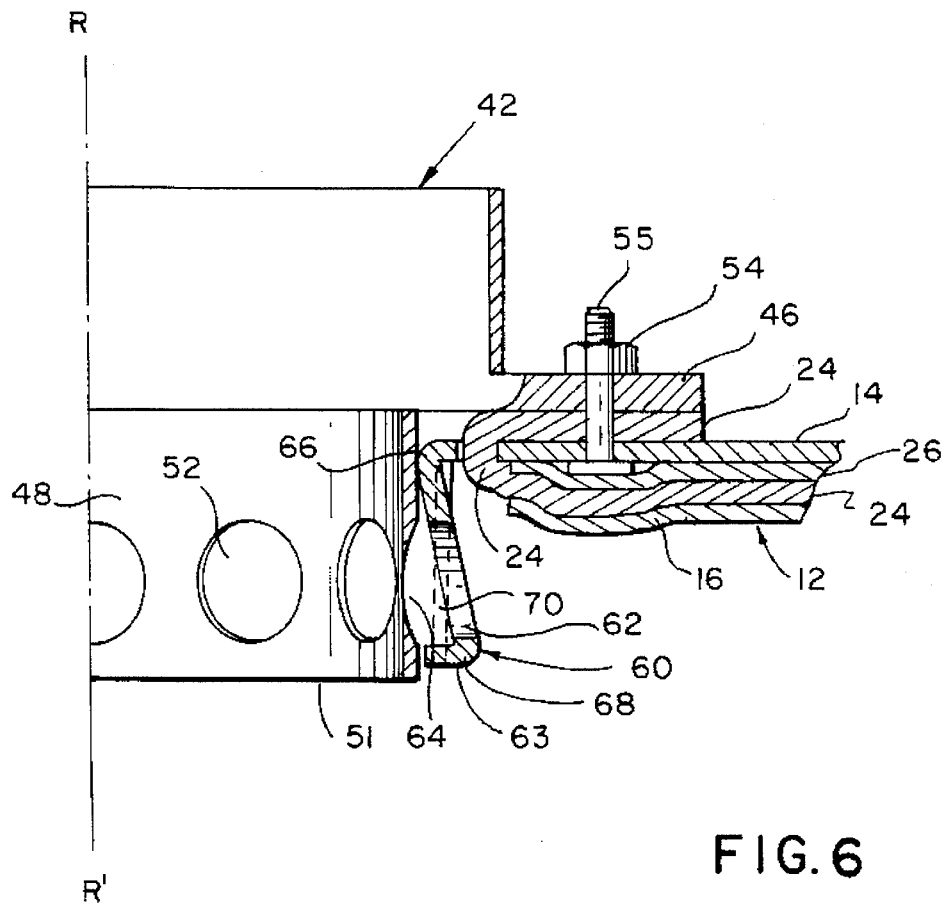
FIG. 6 is a plan view on an enlarged scale of the cross-section of the inflator restraint system shown in FIG. 4A, fully assembled with the cushion in a pre-deployed position, taken along the lines B—B.

As shown in FIGS. 4, 4A and 6, cushion assembly 10 and inflator 42 are joined together by inserting bolts 55 through openings 36 of cushion housing 14, into stud retention flap openings 40, and then through corresponding openings 47 provided in inflator flange 46. As shown in FIGS. 4A and 6, when nuts 54 are tightened about their respective bolts 55, it will secure inflator flange 46 to cushion housing 14 with the stud retention flaps 24 retained therebetween. It will be understood that stud retention flaps 24 can be eliminated in whole or in part in favor of additional tab retention flaps 22, or alternatively, stud retention flaps 24 may be used in place of tab retention flaps 22 depending on the number of fasteners, e.g., bolts or studs, as the case may be, that are employed for securing the inflator to housing 14.

As shown in FIG. 4, diffuser 48 will project through housing opening 20 into gas inlet opening 16 of cushion 12 such that the inflator gas will be dispensed radially outward relative to central axis R-R' from diffuser orifices 52 into the cushion interior upon activation of inflator 42. As already indicated under the Summary Of The Invention section herein, diffuser 48 serves the function of throttling the inflator gas thereby dispensing the inflator gas into cushion 12 in a uniform manner. It also tends to cool the temperature of the inflator gas. However, because the inflator gas typically contains solid residue or fragments as the result of the activation of the pyrotechnic charge, cushion retention flaps 22 and 24 will be subjected to the residue discharge by virtue of a portion of the flaps' proximate location to diffuser apertures 52.

In accordance with another embodiment of the invention, therefore, and referring to FIGS. 4A and 5, the inflatable restraint system may include the addition of a partition 60 in the form of a sleeve 61 which forms part of housing 14 by depending from the perimeter of housing inlet opening 20 for receiving diffuser 48 therein. Sleeve 61 of partition 60 is provided with a plurality of apertures 62 to allow passage of the inflator gas from diffuser apertures 52 therethrough, into the interior of cushion 12. Thus, partition 60 provides an additional means for regulating the rate of flow of inflator gas into cushion 12.

Figure 7:
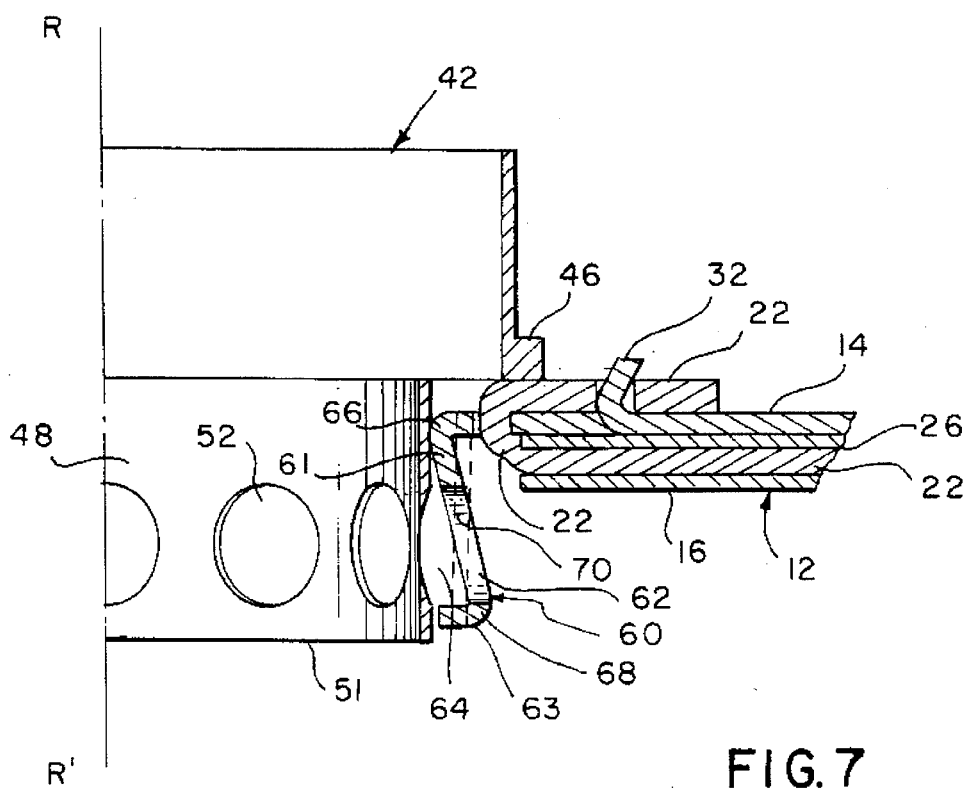
FIG. 7 is a plan view on an enlarged scale of the cross-section of the inflator restraint system, shown in FIG. 4A, fully assembled with the cushion in a pre-deployed position, taken along the lines C—C.
Figure 8:
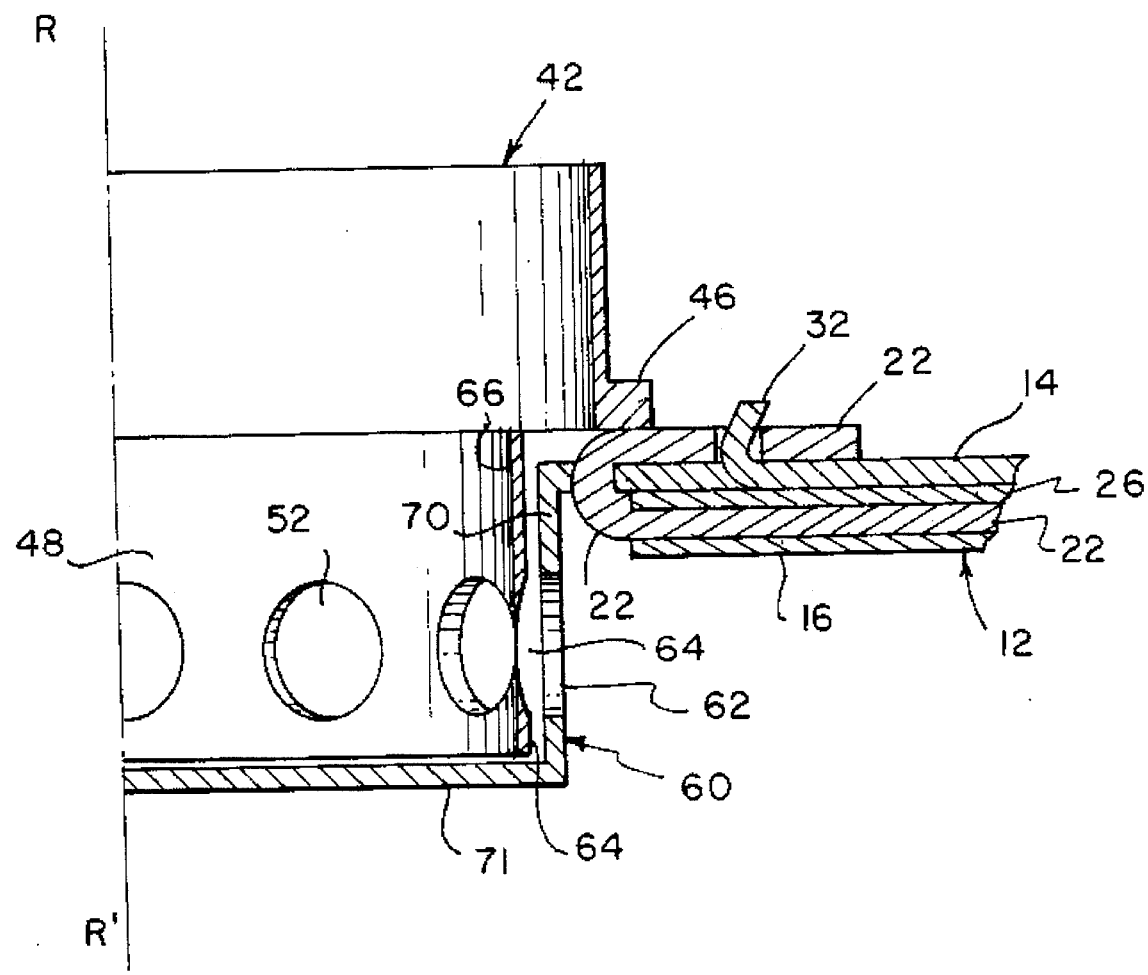
FIG. 8 is a plan view on an enlarged scale of an alternative embodiment for the inflator restraint system shown in FIG. 7.

As can best be seen in FIGS. 6 and 7, sleeve 61 has a slight frustum shape with its narrowest cross-section 66 being positioned at housing inlet opening 20 and its broadest section 68 forming its base. When inflator 42 is fixed to housing 14, the cylindrical sleeve 51 of diffuser 48 will be slidably received within partition 60. Because of the frustum-shaped configuration of partition 60, the receipt of diffuser 48 within partition 60 defines a continuous space between the two members by forming an annular space 64 below narrow section 66 of sleeve 51. As an alternative, partition 60 may take the form of a cylindrical sleeve 70 as shown in FIG. 8 and represented by dashed lines 70 in FIGS. 6 and 7. In this embodiment, a continuous space between the diffuser and partition will be defined such that annular space 64 will extend over the entire height of sleeve 70 and the cylindrical sleeve 50 of diffuser 48. In each case, an annular closure plate 63 may be joined to or made part of sleeves 61 and 70 for the collection thereon of solid particles or fragments emanating from the inflator gas. In another embodiment, a partition closure plate 71 may be used to seal off the entire bottom opening of partition 60 as shown in FIG. 8 which will define partition 60 as a closed-end container within which diffuser 48 will be housed. Each of these embodiments provides an additional impediment to the entry of inflator gas particles and fragments into the cushion interior from the lower or bottom portion of annular space 64.

By inserting partition 60 between diffuser 48 and the cushion interior, the gas inlet opening 16 of cushion 12, as well as retention flaps 22 and 24, are substantially shielded from the heat and pressure of the inflator gas, the effect of which will minimize the possibility of rupture or separation of the flaps' attachment to housing 14. In addition, partition 60 provides another surface for the adherence of gas particles and solid residue. In order to further inhibit the entry of solid matter of inflator gas into cushion 12, a covering means in the form of a coarse screen 72 or perforated metal sheet may be added to partition 60, preferably in the space 64 between the partition and diffuser 48 as shown in FIG. 5. A filtration effect may be obtained by replacing coarse screen 72 with a filter material in the form of wraps or woven metal and/or ceramic fiber materials which are commonly known in the art.

The inflatable cushion assembly and system according to the invention described above provides an inexpensive and economical means by which a cushion is attached to its housing counterpart within an inflatable restraint system. Cushion retainer or attachment rings, which would otherwise add complexity to the assembly process and add to the weight of the system, are avoided. Additionally, the improved inflator restraint system offers a partition as part of the cushion housing that enhances the throttling and cooling of the inflator gas, while at the same time improves the quality of gas entering the cushion by substantially preventing the entry of solid inflator gas residue.

Since other modifications and changes may be varied to fit the particular operating requirements and environments of the invention, which will be apparent to those skilled in the art, the invention is not considered to be limited to the embodiments chosen for purposes of disclosure, and covers all changes and modifications which do not constitute departures from the true spirit and scope thereof.

The various attributes and features which characterize the novelty of the invention are described with particularity in the following claims annexed to and forming part of this specification.

What is claimed is:

1. An inflatable cushion assembly for use in an inflatable restraint system comprising:
    a) an inflatable cushion including (i) a gas inlet opening for receiving a gas from an inflator to inflate the cushion, and (ii) a plurality of retention flaps extending from the periphery of the gas inlet opening of said cushion, at least a portion of said retention flaps each including an opening therethrough;
    b) a housing for containing the cushion interiorly thereof, said housing including an inlet opening communicating with the gas inlet opening of the cushion to permit passage of the gas from the inflator therethrough; and
    c) means for attaching the cushion to the housing, including (i) a plurality of cushion retention flap openings, disposed in the housing about its inlet opening, for receiving a corresponding number of the retention flaps therethrough, and (ii) means for securing the retention flaps to the housing, said securing means including a plurality of tabs extending exteriorly from the housing proximate to the respective cushion retention openings, each said tab being engaged with a corresponding said opening in a portion of the retention flaps after the insertion of the flaps through their corresponding cushion retention openings.

2. The assembly of claim 1, wherein the cushion retention openings are in the form of arcuate slots, said slots being substantially concentric with the inlet opening of the housing.

3. The assembly of claim 1, wherein said securing means further includes a plurality of studs, each said stud being inserted through a corresponding said opening in a remainder of said retention flaps, and said studs being inserted through the housing.

4. The assembly of claim 1, wherein said securing means further includes a plurality of nut and bolt arrangements, each said nut and bolt arrangement being inserted through a corresponding said opening in a remainder of said retention flaps, and said nut and bolt arrangements being inserted through the housing.

5. The assembly of claim 1, wherein the tabs and housing are monolithic.

6. The assembly of claim 1, further including a diffuser, and wherein the housing additionally includes a partition formed about the housing inlet opening for receiving the diffuser therein to separate the diffuser from the interior of the cushion, said partition having a plurality of apertures to allow passage of the gas from the diffuser into the cushion.

7. The assembly of claim 6, wherein the diffuser and partition are configured such that an annular space is created between them.

8. The assembly of claim 7, wherein the space between the partition and diffuser is provided with a closure means below said diffuser and below said partition apertures relative to the housing inlet opening for the collection of solid inflator gas residue.

9. The assembly of claim 8, wherein the closure means is in the form of a plate positioned between the diffuser and partition and secured to the partition.

10. The assembly of claim 6, wherein the partition is provided with a closure plate for housing the diffuser within said partition.

11. The assembly of claim 6, wherein the apertures of the partition are provided with a covering means for inhibiting the entry of solid inflator gas residue into the cushion.

12. The assembly of claim 11; wherein the covering means is positioned between the diffuser and partition.

13. The assembly of claim 12, wherein the covering means comprises a coarse screen.

14. An inflatable cushion restraint system comprising:
   a) an inflatable cushion including (i) a gas inlet opening for receiving a gas to inflate the cushion, and (ii) a plurality of retention flaps extending from the periphery of the gas inlet opening of said cushion;
   b) an inflator for generating a gas to inflate the cushion, said inflator including (i) a diffuser containing a plurality of apertures for uniformly directing the gas into the cushion, and (ii) a flange;
   c) a housing for containing the cushion interiorly thereof, said housing being secured to said inflator flange and including an inlet opening communicating with the gas inlet opening of the cushion to permit passage of the gas from the inflator into the cushion;
   d) means for attaching the cushion to the housing, including (i) a plurality of cushion retention flap openings, circumferentially disposed in the housing about its inlet opening, for receiving a corresponding number of the retention flaps therethrough, and (ii) means for securing the retention flaps to the housing, including a plurality of protrusions extending exteriorly from the housing proximate to the respective cushion retention openings, said protrusions being configured for engagement with the corresponding retention flaps after the insertion of the flaps through their corresponding cushion retention openings, and wherein at least a portion of said retention flaps are retained between said housing and said inflator flange.

15. The system of claim 14, wherein the cushion retention flap openings are in the form of arcuate slots, said slots being substantially concentric with the inlet opening of the housing.

16. The system of claim 14, wherein at least a portion of the protrusions are in the form of studs inserted through the housing, retention flaps and inflator flange for their securement to each other.

17. The system of claim 14 wherein at least a portion of the protrusions are in the form of a nut and bolt arrangement.

18. The system of claim 14, wherein at least a portion of the protrusions are in the form of tabs projecting exteriorly from the housing.

19. The system of claim 18, wherein the tabs and housing are monolithic.

20. The system of claim 14, wherein said protrusions comprise a combination of (i) a plurality of studs inserted through the housing, each through a corresponding opening provided in a first group of the retention flaps, and through the inflator flange; and (ii) a plurality of tabs projecting exteriorly of the housing and each engaged with a corresponding opening provided in a second group of the retention flaps.

21. The system of claim 14, wherein the housing additionally includes a partition formed about the housing inlet opening for receiving the diffuser therein to separate the diffuser from the interior of the cushion, said partition having a plurality of apertures to allow passage of the gas from the diffuser into the cushion.

22. The system of claim 21, wherein the diffuser and partition are configured such that an annular space is created between them.

23. The system of claim 22, wherein the space between the partition and diffuser is provided with a closure means below said diffuser and partition apertures relative to the housing inlet opening for the collection of solid inflator gas residue.

24. The system of claim 23, wherein the closure means is in the form of a plate positioned between the diffuser and partition and secured to the partition.

25. The system of claim 21, wherein the partition is provided with a closure plate for housing the diffuser within said partition.

26. The system of claim 21, wherein the apertures of the partition are provided with a covering means for inhibiting the entry of solid inflator gas residue into the cushion.

27. The system of claim 26, wherein the covering means is positioned between the diffuser and partition.

28. The system of claim 27, wherein the covering means comprises a coarse screen.

29. An inflatable cushion assembly for use in an inflatable restraint system comprising:
   a) an inflatable cushion including (i) a gas inlet opening for receiving a gas from an inflator to inflate the cushion, and (ii) a plurality of retention flaps extending from the periphery of the gas inlet opening of said cushion;
   b) a housing for containing the cushion interiorly thereof, said housing including an inlet opening communicating with the gas inlet opening of the cushion to permit passage of the gas from the inflator therethrough;
   c) means for attaching the cushion to the housing, including (i) a plurality of cushion retention flap openings, disposed in the housing about its inlet opening, for receiving a corresponding number of the retention flaps therethrough, the cushion retention openings are in the form of arcuate slots, said slots being substantially concentric with the inlet opening of the housing, and (ii) means for securing the retenion flaps to the housing, said securing means including a plurality of protrusions extending exteriorly from the housing proximate to the respective cushion retention openings, said protrusions being configured for engagement with the corresponding retention flaps after the insertion of the flaps through their corresponding cushion retention openings.

30. The assembly of claim 29, further including an inflator having a flange, and wherein the retention flaps are retained between said housing and inflator flange.

31. The assembly of claim 29, wherein the protrusions are engaged with respective openings provided in the retention flaps of the cushion.

32. The assembly of claim 29, further including a diffuser, and wherein the housing additionally includes a partition formed about the housing inlet opening for receiving the diffuser therein to separate the diffuser from the interior of the cushion, said partition having a plurality of apertures to allow passage of the gas from the diffuser into the cushion.

33. The assembly of claim 32, wherein the diffuser and partition are configured such that an annular space is created between them.

34. The assembly of claim 33, wherein the space between the partition and diffuser is provided with a closure means below said diffuser and below said partition apertures relative to the housing inlet opening for the collection of solid inflator gas residue.

35. The assembly of claim 34, wherein the closure means is in the form of a plate positioned between the diffuser and partition and secured to the partition.

36. The assembly of claim 32, wherein the partition is provided with a closure plate for housing the diffuser within said partition.

37. The assembly of claim 32, wherein the apertures of the partition are provided with a covering means for inhibiting the entry of solid inflator gas residue into the cushion.

38. The assembly of claim 37, wherein the covering means is positioned between the diffuser and partition.

* * * * *